United States Patent
Hagood, IV et al.

(10) Patent No.: US 6,580,177 B1
(45) Date of Patent: Jun. 17, 2003

(54) ELECTRICAL POWER EXTRACTION FROM MECHANICAL DISTURBANCES

(75) Inventors: Nesbitt W. Hagood, IV, Wellesley, MA (US); Kamyar Ghandi, Arlington, MA (US)

(73) Assignee: Continuum Control Corporation, Billerica, MA (US)

( * ) Notice: Subject to any disclaimer, the term of this patent is extended or adjusted under 35 U.S.C. 154(b) by 24 days.

(21) Appl. No.: 09/323,739

(22) Filed: Jun. 1, 1999

(51) Int. Cl.$^7$ ............................................... H02P 9/04
(52) U.S. Cl. ........................... 290/1 R; 290/42; 290/43; 290/53; 290/54
(58) Field of Search ................................ 310/319, 338; 290/312, 1 R

(56) References Cited

U.S. PATENT DOCUMENTS

| | | | |
|---|---|---|---|
| 3,666,976 A | 5/1972 | Gourlay et al. | 310/339 |
| 3,819,963 A | 6/1974 | Kondo et al. | 310/8.7 |
| 4,091,302 A | 5/1978 | Yamashita | 310/339 |
| 4,387,318 A | 6/1983 | Kolm et al. | 310/330 |
| 4,404,490 A | 9/1983 | Taylor | 310/339 |
| 4,442,372 A | 4/1984 | Roberts | 310/339 |
| 4,459,539 A | 7/1984 | Cordy, Jr. | 323/299 |
| 4,467,236 A | 8/1984 | Kolm et al. | 310/321 |
| 4,504,761 A | 3/1985 | Triplett | 310/800 |
| 4,536,700 A | 8/1985 | Bello et al. | 323/285 |
| 4,546,421 A | 10/1985 | Bello et al. | 363/21 |
| 4,595,856 A | 6/1986 | Glomb, Jr. | 310/339 |
| 4,615,214 A | 10/1986 | Burns | 73/189 |
| 4,629,970 A | 12/1986 | Johansson | 323/285 |
| 4,665,911 A | 5/1987 | Williams et al. | 128/204.21 |
| 4,685,296 A | 8/1987 | Burns | 60/497 |
| 4,748,366 A | 5/1988 | Taylor | 310/320 |
| 4,845,338 A | 7/1989 | Lakic | 219/211 |
| 4,849,668 A | 7/1989 | Crawley et al. | 310/328 |
| 4,853,580 A | 8/1989 | Sula | 310/339 |
| 4,933,230 A | 6/1990 | Card et al. | 428/242 |
| 4,939,707 A | 7/1990 | Nagao | 368/64 |
| 5,208,506 A | 5/1993 | Yamashita | 310/328 |
| 5,245,242 A | 9/1993 | Hall | 310/316 |
| 5,305,507 A | 4/1994 | Dvorsky et al. | 29/25.35 |
| 5,404,067 A | 4/1995 | Stein et al. | 310/330 |
| 5,431,694 A | 7/1995 | Snaper et al. | 607/35 |
| 5,512,795 A | 4/1996 | Epstein et al. | 310/339 |
| 5,548,177 A | 8/1996 | Carroll | 310/339 |
| 5,552,656 A | 9/1996 | Taylor | 310/337 |
| 5,552,657 A | 9/1996 | Epstein et al. | 310/339 |
| 5,578,889 A | 11/1996 | Epstein | 310/339 |
| 5,621,264 A | 4/1997 | Epstein et al. | 310/339 |
| 5,656,882 A | 8/1997 | Lazarus et al. | 310/328 |
| 5,687,462 A | 11/1997 | Lazarus et al. | 29/25.35 |
| 5,703,474 A | 12/1997 | Smalser | 323/299 |
| 5,751,091 A | 5/1998 | Takahashi et al. | 310/339 |
| 5,775,715 A | 7/1998 | Vandergrift | 280/602 |
| 5,783,898 A | 7/1998 | Wu | 310/316 |
| 5,801,475 A | 9/1998 | Kimura | 310/339 |
| 5,814,921 A | 9/1998 | Carroll | 310/339 |
| 5,835,996 A | 11/1998 | Hashimoto et al. | 323/364 |
| 5,839,508 A | 11/1998 | Tubel et al. | 166/65.1 |
| 5,857,694 A | 1/1999 | Lazarus et al. | 280/602 |

FOREIGN PATENT DOCUMENTS

| | | |
|---|---|---|
| CA | 2257935 | 12/1997 |
| EP | 0 673 102 A1 | 9/1995 |
| WO | WO9704841 | 2/1997 |
| WO | WO97/19474 | 5/1997 |
| WO | WO9834689 | 8/1998 |
| WO | WO 99/23749 | 10/1998 |

OTHER PUBLICATIONS

International Search Report dated Oct. 19, 2000.

*Primary Examiner*—Nicholas Ponomarenko
(74) *Attorney, Agent, or Firm*—Fish & Richardson P.C.

(57) ABSTRACT

A method of extracting power includes coupling a transducer that converts mechanical power to electrical power to a disturbance; coupling an electrical circuit to the transducer such that a peak voltage experienced by the transducer is greater than two times higher than any peak voltage of an open circuit transducer due to the disturbance alone; extracting power from the transducer using the electrical circuit, and storing extracted power. Power is extracted from the transducer and applied to the transducer during different intervals in the course of the disturbance. A system for extracting power includes a transducer, an electrical circuit, and a storage element for storing extracted power.

87 Claims, 12 Drawing Sheets

FIG. 3A $V_{TRANSDUCER}(V)$
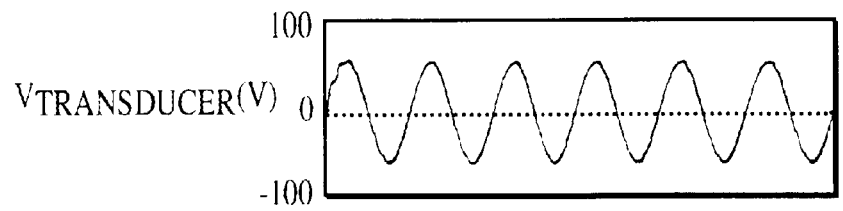
FIG. 3B $I_{TRANSDUCER}(A)$
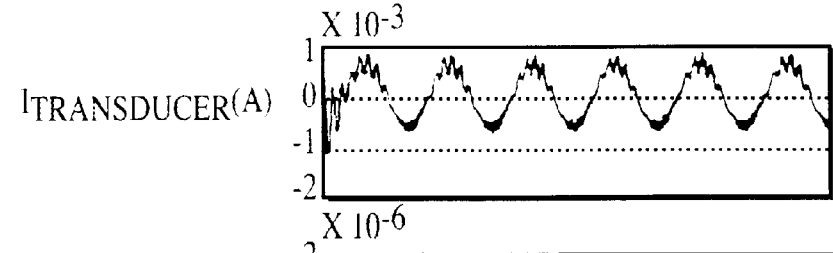
FIG. 3C $Q_{TRANSDUCER}(C)$
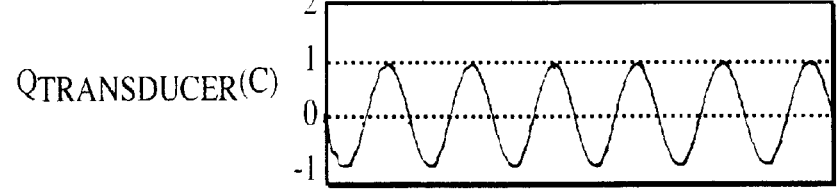
FIG. 3D $P_{TRANSDUCER}(W)$
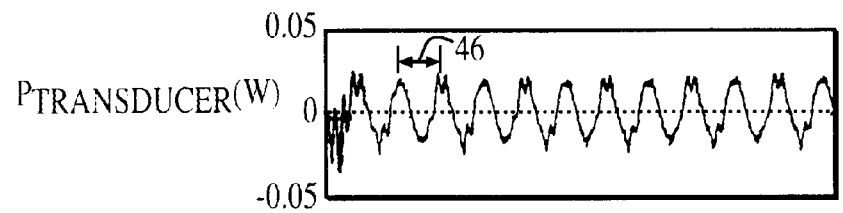
FIG. 3E $P_{INDUCTOR}(W)$
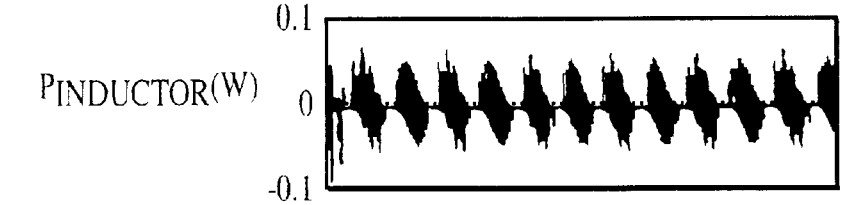
FIG. 3F $P_{EXTRACT}(W)$
FIG. 3G $E_{EXTRACT}(J)$
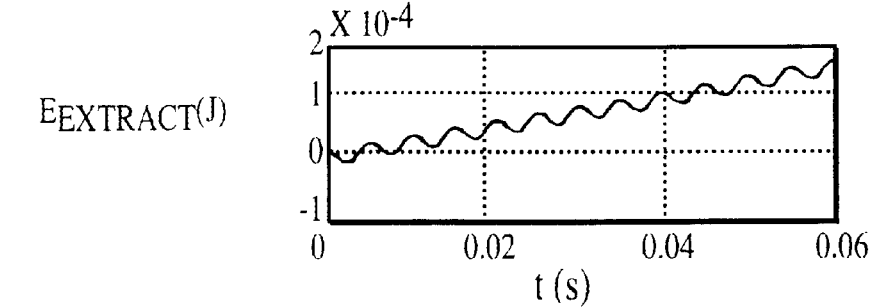

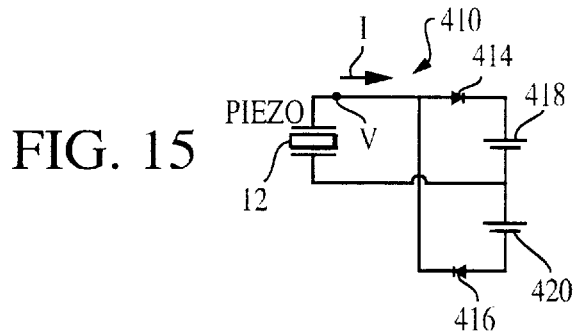
FIG. 15
FIG. 16A  TRANSDUCER VOLTAGE
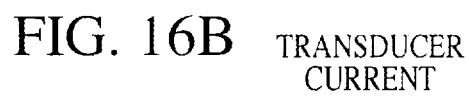
FIG. 16B  TRANSDUCER CURRENT
FIG. 16C  $Q_{TRANSDUCER}(C)$
FIG. 16D  $P_{TRANSDUCER}(W)$
FIG. 16E  $P_{EXTRACT}(W)$
FIG. 16F  $E_{EXTRACT}(J)$
t (s)

ELECTRICAL POWER EXTRACTION FROM MECHANICAL DISTURBANCES

STATEMENT AS TO FEDERALLY SPONSORED RESEARCH

The U.S. Government has certain rights in the invention under Contract Number DAAH01-97-C-R 310 awarded by Defense Advanced Research Projects Agency (DARPA).

BACKGROUND OF THE INVENTION

The invention relates to extracting energy, and, more particularly, to extracting electrical power from a mechanical disturbance.

A transducer, for example, a piezoelectric transducer, which converts mechanical energy to electrical energy can be used to extract electrical power from a disturbance. It is known to use piezoelectric transducers to extract power from, for example, ocean waves.

SUMMARY OF THE INVENTION

A transducer, for example, a piezoelectric transducer, an antiferroelectric transducer, an electrostrictive transducer, a piezomagnetic transducer, a magnetostrictive transducer, or a magnetic shape memory transducer, can be used to convert energy in form of, for example, a mechanical disturbance, to electrical energy. Examples of sources of mechanical energy include: environmental sources such as wind, ocean waves, and earth motion; vibrating machinery such as rotating machinery, compressors, gears, and bearings; human motion such as walking, running, climbing, and hand gestures; human input such as by winding-up a device or shaking a device; vehicle motion such as automobile motion, aircraft motion, and satellite motion; movement of civil structures such as bridges and buildings; acoustic sources such as noise and speech; and impact on or motion of sports equipment.

Electrical power extracted from, for example, human locomotion, can be used to power any device where portable power is needed, for example, personal consumer electronics such as cell phones, pagers, personal organizers, and portable tape players, CD players, and radios. Electrical power extracted from, for example, a vibrating structure such as a tennis racket (or any other sporting equipment), can be used to self-power the transducer and supporting electronics for use of the transducer as a vibration suppression actuator, or to power sensors on the sporting equipment or other special effects. Power extracted from, for example, machinery motion, can be used to self-power the transducer for use as a vibration suppression actuator or to provide power for a remote sensor and wireless telemetry in, for example, condition based maintenance of machinery and structures.

According to one aspect of the invention, a method of extracting power includes coupling a transducer that converts mechanical power to electrical power to a disturbance; coupling an electrical circuit to the transducer such that a peak voltage experienced by the transducer is greater than two times higher than any peak voltage of an open circuit transducer due to the disturbance alone; extracting power from the transducer using the electrical circuit, and storing extracted power.

Embodiments of this aspect of the invention may include one or more of the following features.

The stored extracted power is applied to an external load. Coupling the electrical circuit includes applying stored extracted power to the transducer. Coupling the electrical circuit includes coupling a resonant circuit to the transducer. Coupling the electrical circuit includes controlling switches electrically connected to the transducer. A system state is monitored and the switches are controlled based on the system state. The duty cycle of the switches is controlled.

Coupling the electrical circuit can act to increase oscillations of the disturbance. Alternatively, coupling the electrical circuit can act to dampen oscillations of the disturbance.

In one illustrated embodiment, a plurality of transducers are coupled to the disturbance. Coupling the transducer includes attaching the transducer to a structure.

According to another aspect of the invention, a method of extracting power includes coupling a transducer that converts mechanical power to electrical power to a disturbance; coupling an electrical circuit to the transducer such that a peak of the integral of the current onto and off the transducer is greater than two times higher than any peak of an integral of a current of a short circuit transducer due to the disturbance alone; extracting power from the transducer using the electrical circuit; and storing extracted power.

According to another aspect of the invention, a method of extracting power includes coupling a transducer that converts mechanical power to electrical power to a disturbance; measuring a mechanical state with a sensor, controlling an electrical circuit coupled to the transducer based on the measured system state; extracting power from the transducer using the electrical circuit; and storing extracted power.

According to another aspect of the invention, a method of extracting power includes coupling a transducer that converts mechanical power to electrical power to a disturbance; controlling switches of an electrical circuit coupled to the transducer such that the switches switch at a frequency greater than two times an excitation frequency of the disturbance; extracting power from the transducer using the electrical circuit; and storing extracted power.

According to another aspect of the invention, a method of extracting power includes coupling a transducer that converts mechanical power to electrical power to a mechanical disturbance; extracting power from the transducer and applying power to the transducer during different intervals in the course of the disturbance; and storing extracted power.

Embodiments of this aspect of the invention may include one or more of the following features.

The step of extracting power from the transducer and applying power to the transducer occurs in a single cycle. The step of extracting power from the transducer and applying power to the transducer includes the use of a resonant circuit or amplifier electronics.

According to another aspect of the invention, a system for extracting power includes a transducer that converts mechanical power to electrical power, an electrical circuit, and a storage element for storing extracted power. The transducer is configured for coupling to a disturbance. The electrical circuit is connected across the transducer such that a peak voltage experienced by the transducer is greater than two times higher than any peak voltage of an open circuit transducer due to the disturbance alone.

Embodiments of this aspect of the invention may include one or more of the following features.

The circuit includes a resonant circuit and a rectification circuit. Alternatively, the circuit includes amplifier electronics, for example, arranged as a H-bridge or a half bridge. Control electronics control the amplifier electronics. The control electronics control a duty cycle of the amplifier electronics. The electrical circuit includes a sensor for monitoring a system state.

The storage element is, for example, a capacitor or rechargeable battery. The storage element can include two components connected in series; a side of the transducer is connected to a node between the two components.

According to another aspect of the invention, a system for extracting power includes a transducer that converts mechanical power to electrical power, an electrical circuit, and a storage element for storing extracted power. The transducer is configured for coupling to a disturbance. The electrical circuit is connected across the transducer such that a peak of the integral of the current onto and off the transducer is greater than two times higher than any peak of an integral of a current of a short circuit transducer due to the disturbance alone.

According to another aspect of the invention, a system for extracting power includes a transducer that converts mechanical power to electrical power, an electrical circuit, control logic, and a storage element for storing extracted power. The transducer is configured for coupling to a mechanical disturbance. The electrical circuit includes switching electronics connected across the transducer such that a peak voltage experienced by the transducer is higher than any peak voltage of an open circuit transducer due to the mechanical disturbance alone. The control logic switches the switching electronics at a frequency greater than two times an excitation frequency of the disturbance.

Embodiments of this aspect of the invention may include one or more of the following features.

A sensor measures a system state, and the frequency of switching is based on the measured system state. The control logic controls the switching electronics. The duty cycle of the switching electronics is controlled.

According to another aspect of the invention, a system for extracting power includes a transducer that converts mechanical power to electrical power, an electrical circuit, and a storage element for storing extracted power. The transducer is configured for coupling to a disturbance. The electrical circuit is connected across the transducer and is capable of extracting power from the transducer and applying power to the transducer during different intervals in the course of the disturbance.

According to another aspect of the invention, a method for extracting power includes coupling a transducer that converts mechanical power to electrical power to a disturbance; coupling a resonant circuit to the transducer; and coupling a rectifier to the resonant circuit. Extracted electrical power is used to directly power an external application.

According to another aspect of the invention, a system for extracting power includes a transducer that converts mechanical power to electrical power. The transducer is configured for coupling to a disturbance. A resonant circuit is coupled to the transducer, and a rectifier is coupled to the resonant circuit. Extracted electrical power is used to directly power an external application.

According to another aspect of the invention, a system for extracting power includes a transducer that converts mechanical power to electrical power. The transducer is configured for coupling to a disturbance. A passive voltage doubling rectifier is connected across the transducer. Alternatively, a N-stage parallel fed voltage multiplier is connected across the transducer.

BRIEF DESCRIPTION OF THE DRAWINGS

Other objects, features and advantages of the invention will be apparent from the following description, taken together with the drawings, in which:

FIGS. 3A–3G are various voltage, current, power, and energy waveform diagrams of the circuit of FIG. 1B;

FIG. 15 is a circuit diagram of a passive rectifier power extraction system;

FIGS. 16A–16F are various voltage, current, power, and energy waveform diagrams of the circuit of FIG. 15;

DESCRIPTION OF THE PREFERRED EMBODIMENTS

Figure 1A:
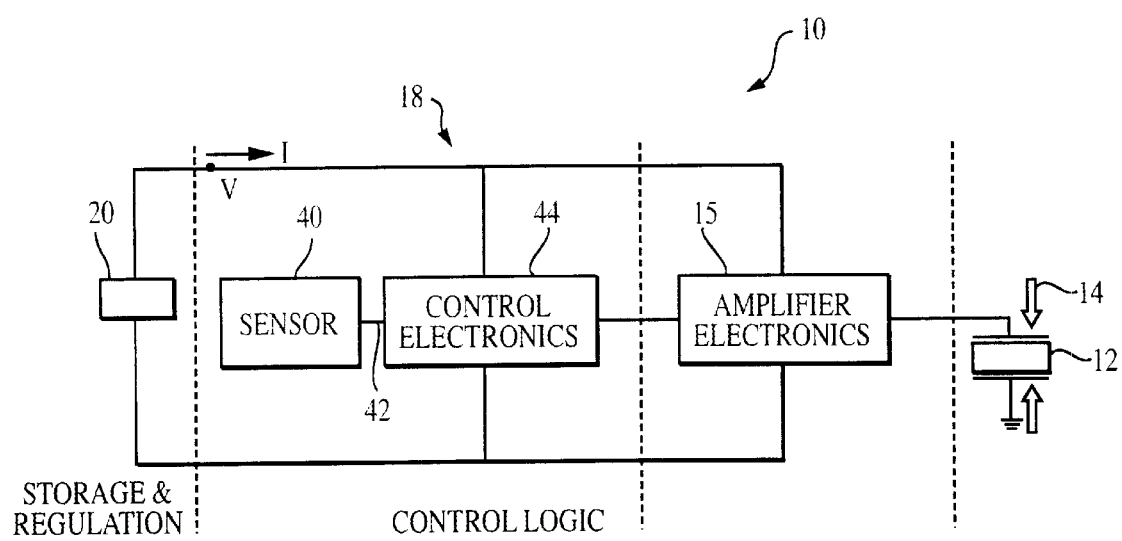
FIG. 1A is a block diagram of a power extraction system.

Referring to FIG. 1A, an electronic circuit 10 for extracting electrical power from a transducer 12 acted upon by a disturbance 14 includes amplifier electronics 15, for example, any amplifier that allows bi-directional power flow to and from transducer 12 such as a switching amplifier, a switched capacitor amplifier, or a capacitive charge pump; control logic 18; and a storage element 20, for example, a rechargeable battery, capacitor or combination thereof. Amplifier electronics 15 provides for flow of electrical power from transducer 12 to storage element 20, as well as from storage element 20 to transducer 12.

Figure 1B:
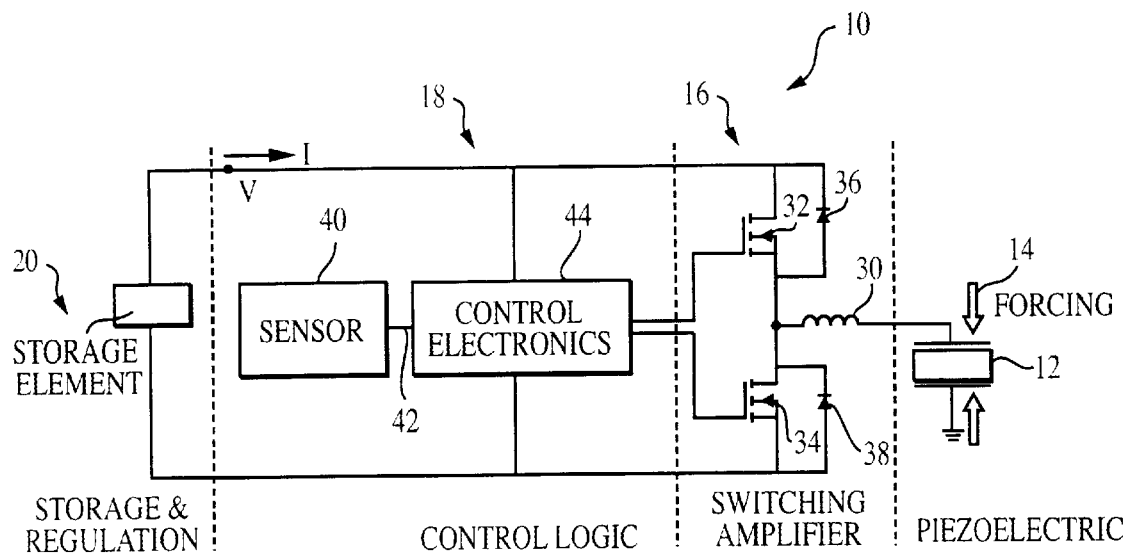
FIG. 1B is a circuit diagram of a particular embodiment of the power extraction system of FIG. 1A.

Referring to FIG. 1B, a switching amplifier 16 includes switches, for example, MOSFETs 32, 34, ZGBTs, or SCRs, arranged in a half bridge, and diodes 36, 38. (Alternatively the switches can be bidirectional with no diodes.) MOSFETs 32, 34 are switched on and off at high frequencies of, for example, about 100 kHz. Switching amplifier 16 connects to transducer 12 through an inductor 30. The value of inductor 30 is selected such that inductor 30 is tuned below the high frequency switching of MOSFETs 32, 34 and above the highest frequency of importance in the energy of disturbance 14 with inductor 30 acting to filter the high frequency switching signals of circuit 16.

The current flow through inductor 30 is determined by the switching of MOSFETs 32, 34 and can be divided into four phases:

Phase I

MOSFET 32 is off, MOSFET 34 is switched on, the current in inductor 30 increases as the inductor stores energy from transducer 12.

Phase II

MOSFET 34 is turned off and MOSFET 32 is switched on, the current is forced through diode 36 and onto storage element 20 as inductor 30 releases the energy.

Phase III

As the current becomes negative the current stops flowing through diode 36 and flows through MOSFET 32, and energy from storage element 20 is transferred to inductor 30.

Phase IV

MOSFET 32 is then turned off and MOSFET 34 is turned on, current flowing through diode 38 increases, and the energy stored in inductor 30 is transferred to transducer 12.

Figure 2A:
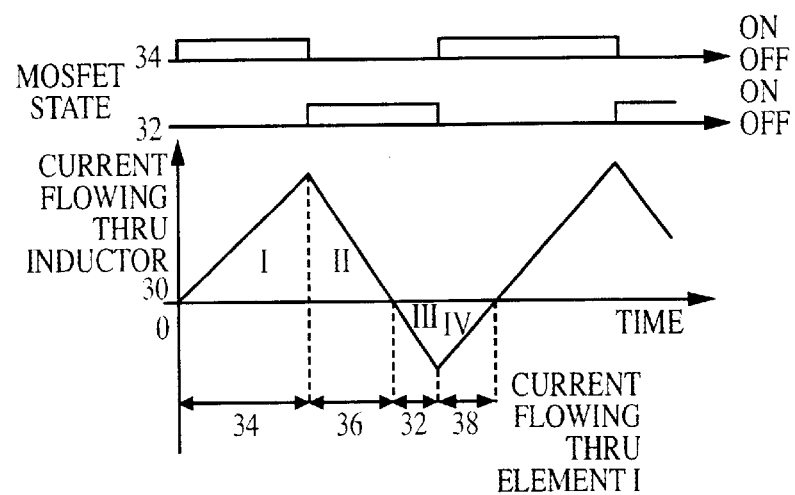
FIG. 2A is a graph of the phases of current flow through an inductor of the circuit of FIG. 1B.
Figure 2B:
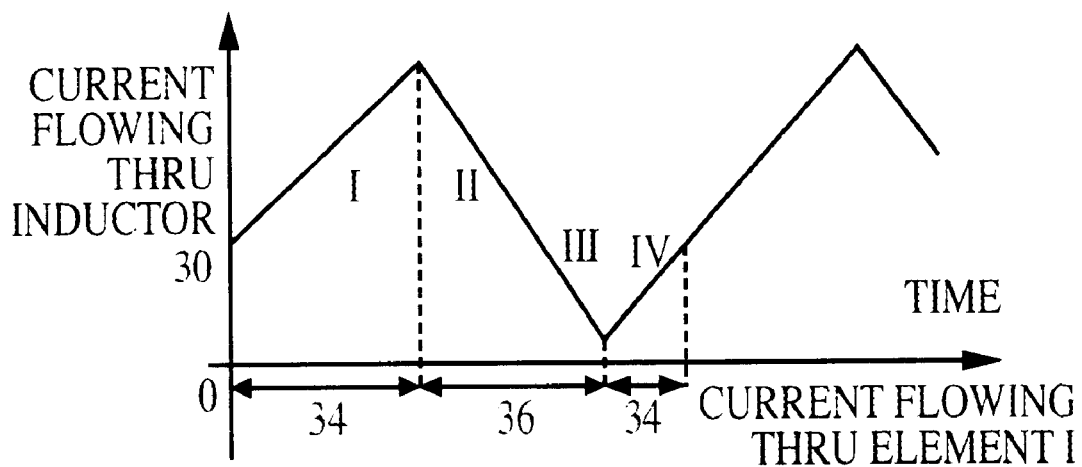
FIGS. 2B and 2C show alternative current flows through the inductor.
Figure 2C:
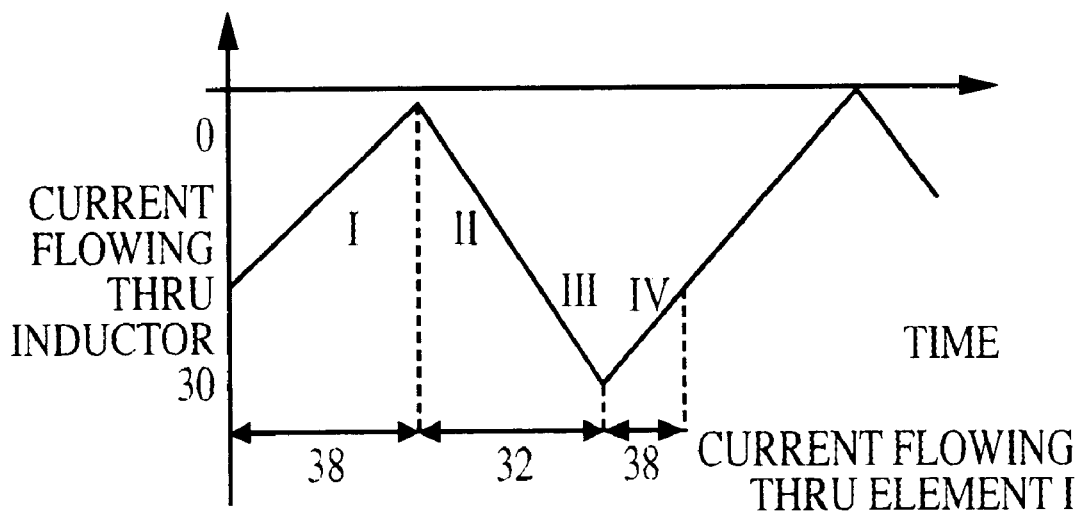

FIG. 2A is a graphical representation of the four phases showing (i) the current through inductor 30 versus time, (ii) which MOSFET or diode current is flowing through in each phase, and (iii) the state of the MOSFETs in each phase. The net current during the switching phases may be positive or negative depending on the state of the disturbance and the duty cycle of the switches. Referring to FIG. 2B, the current may be positive during all four phases in which case the current flows through switch 34 and diode 36. Alternatively, referring to FIG. 2C, the current may be negative during all four phases, in which case the current flows through switch 32 and diode 38.

MOSFET 32 can be off during phase II, and MOSFET 34 can be off during phase IV without affecting the current flow since no current flows through these MOSPETs during the respective phases. If MOSFETs 32, 34 are on during phases II and IV, respectively, a deadtime can be inserted between the turning off of one MOSFET and the turning on of another MOSFET to reduce switching losses from cross conductance across MOSFETs 32, 34.

Figure 4A:
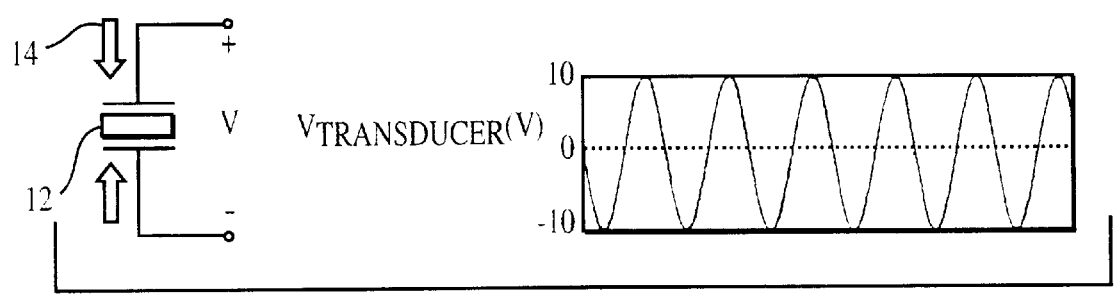
FIG. 4A is a waveform of the voltage across an open circuit transducer.

Referring to FIGS. 3A–3G, an example of the power extracted from transducer 12 is graphically represented where the amplitude of the voltage across an open circuit transducer would have been 10 volts (see FIG. 4A). In this example, transducer 12 is a PZT-5H piezoelectric transducer with a thickness of 2 mm and an area of 10 cm². The properties of this transducer are: compliance $S^E_{33}$= $2.07 \times 10^{-11}$ m²/N, dielectric $\in^T_{33}/\in_o$=3400, and coupling coefficient $d_{33}$=593×10$^{-12}$ m/V. The capacitance of this transducer is 15 nF. The following waveforms correspond to a 100 Hz sinusoidal disturbance with an amplitude of 250 N through the thickness direction, which would produce an open circuit voltage of 10 V on the transducer.

Figure 4B:
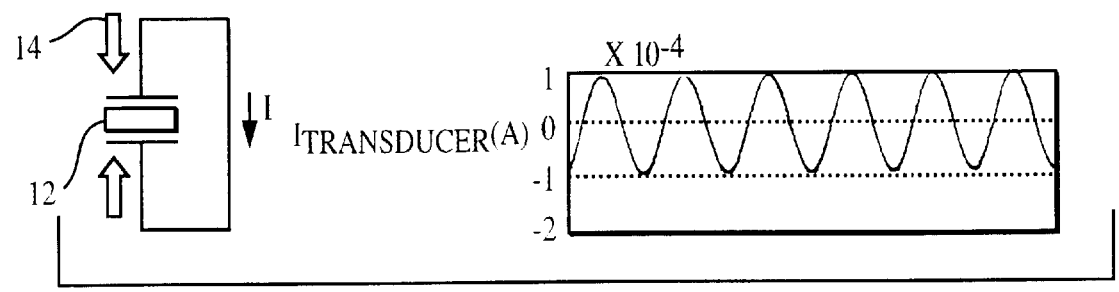
FIG. 4B is a waveform of the current passing through a short circuit transducer.
Figure 4:
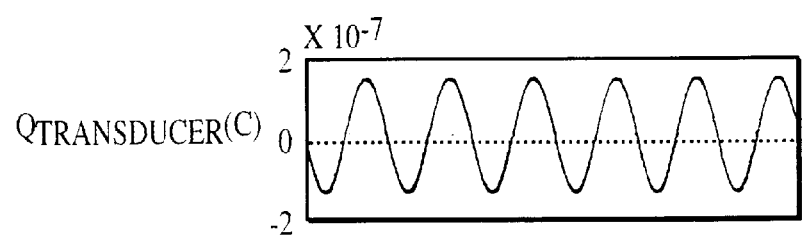
FIG. 4C is a waveform of the charge passing through a short circuit transducer.

FIG. 3A shows the voltage across transducer 12 as a function of time. The peak amplitude of the voltage is greater than twice any peak voltage of an open circuit transducer. Here, the peak amplitude of the voltage is about 60 volts. FIG. 3B shows the current waveform on transducer 12 and FIG. 3C the charge waveform on transducer 12. Due to the flow of current from storage element 20 to transducer 12, the peak of the integral of the current onto and off transducer 12 is greater than two times higher than any peak of an integral of a current of a short circuit transducer due to the disturbance alone (see FIGS. 4B and 4C).

Due to the phasing of the voltage and current waveforms, the power to and from transducer 12, FIG. 3D, alternates between peaks of about 0.021 Watts and −0.016 Watts. Thus, power flows to transducer 12 from storage element 20 and from transducer 12 to storage element 20 during the course of disturbance 14 on transducer 12, for example, during a single sinusoidal cycle 46, with the net power flowing from transducer 12 to storage element 20. The cycle need not be sinusoidal, for example, where the disturbance has multiple frequency harmonics or broad frequency content such as in a square wave, a triangular wave, a saw tooth wave, and white noise bandwidth limited or otherwise.

The power into inductor 30 is shown in FIG. 3E. The high frequency switching of MOSFETs 32, 34, described above, is seen in the power waveform. Where the waveform is positive, power is being stored in inductor 30, and where the waveform is negative, power is being discharged from inductor 30.

The extracted power and energy are shown in FIGS. 3F and 3G. Over a period of 0.06 seconds, approximately $1.5 \times 10^{-4}$ Joules of energy are extracted. An advantage of circuit 10 is that a higher peak voltage and peak charge are seen by the transducer than would otherwise occur and thus higher power can be extracted from the input disturbance. By applying a voltage to transducer 12 having an appropriate amplitude and phasing relative to disturbance 14, transducer 12 will undergo more mechanical deflection under the load than would otherwise occur. Thus, more work is done on transducer 12 by disturbance 14 and more energy can be extracted by circuit 10.

The duty cycle of MOSFETs 32, 34 is controlled by measuring the motion of disturbance 14 and selecting a time-varying duty cycle to match the motion of disturbance 14. This provides for effective power extraction over a wide frequency range of the disturbance. Control logic 18 includes a sensor 40, for example, a strain gage, micropressure sensor, PVDF film, accelerometer, or active fiber composite sensor, which measures the motion or some other property of disturbance 14, and a control electronics 44. Sensor 40 supplies a sensor signal 42 (FIG. 1B) to control electronics 44 which drive MOSFETs 32, 34 of switching amplifier 16. System states which sensor 40 can measure include, for example, vibration amplitude, vibration mode, physical strain, position, displacement, electrical or mechanical states such as force, pressure, voltage or current, and any combination thereof or rate of change of these, as well as temperature, humidity, altitude, or air speed orientation. In general any physically measurable quantity which corresponds to a mechanical or electrical property of the system.

Possible control methods or processes for determining the duty cycle of MOSFETs 32, 34 include rate feedback, positive position feedback, position-integral-derivative feedback (PID), linear quadratic Gaussian (LQG), model based controllers, or any of a multitude of dynamic compensators.

For the example described above with reference to FIGS. 3A–3G, with a disturbance of 100 Hz, a switching frequency of 100 kHz was used. An inductor value of 1.68 H was selected such that the time constant of inductor 30 and transducer 12 corresponds to 1,000 Hz. The duty cycle of MOSFETs 32, 34 was controlled using rate feedback. The voltage on storage element 20 was set to 60 volts. A rate feedback control algorithm was used.

Alternative control methods or processes can maintain MOSFETs 32, 34 in their off states until the transducer voltage reaches a peak, or a pre-specified threshold. MOSFETs 32, 34 are then switched on and off such that the charge generated and stored in the transducer is almost completely drained. The process is then repeated. This increases the amount of energy extracted per cycle.

In other alternative control methods or processes for extracting power from transducer 12, the duty cycle of MOSFETs 32, 34 is specified based on the governing equations for a Boost or Buck converter such that the transducer voltage is stepped up or down to the voltage on the storage element. The Boost converter allows extraction of power from transducer 12 when the open circuit voltage developed across transducer 12 is lower than the voltage on storage element 20. The Buck converter allows efficient extraction of power from transducer 12 when the open circuit voltage developed across transducer 12 is higher than the voltage on storage element 20.

The control methods or processes can include a shut down mode of operation such that when the magnitude of the voltage across transducer 12 is below a certain limit, MOSFETs 32, 34 and portions of the supporting electronics are turned off to prevent unnecessary dissipation of power from storage element 20.

Figure 5:
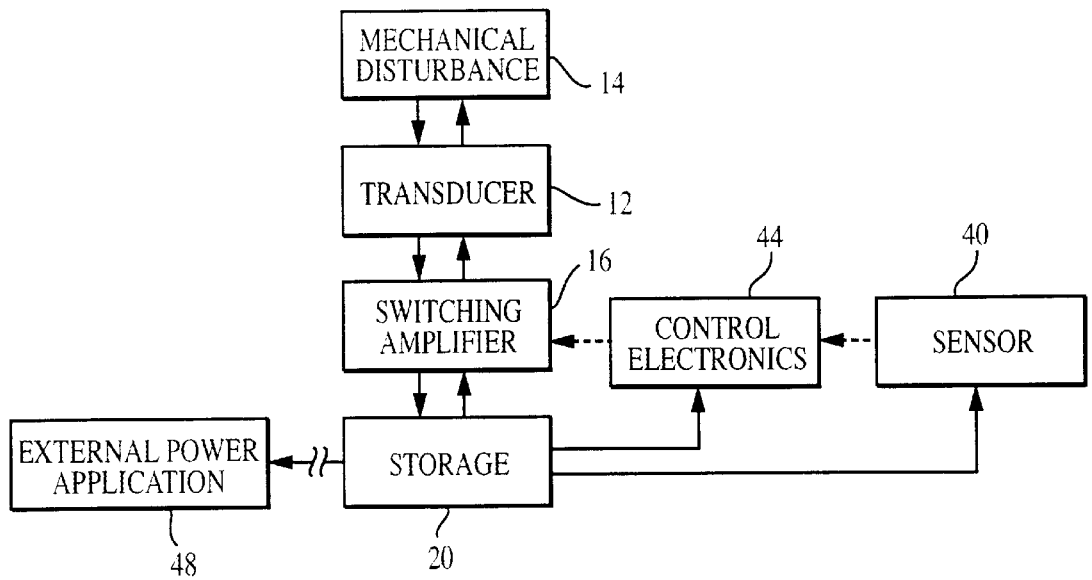
FIG. 5 is a block diagram of the power extraction system of FIG. 1B.

FIG. 5 shows the flow of power between disturbance 14 and storage element 20, and the flow of information (dashed lines). The power from mechanical disturbance 14 is transferred to transducer 12 which converts the mechanical power to electrical power. The power from transducer 12 is transferred to storage element 20 through switching amplifier 16. Power can also flow from storage element 20 to transducer 12 through switching amplifier 16. Transducer 12 can then convert any received electrical power to mechanical power which in turn acts upon a structure 50 (FIG. 6) creating disturbance 14. The net power flows to storage element 20.

The power for sensor 40 and control electronics 44 as well as the cyclic peak power needed by transducer 12 is supplied by the energy accumulated in storage element 20, which has been extracted from disturbance 14. Energy accumulated in storage element 20 can also or alternatively be used to power an external application 48 or the power extraction circuitry itself for vibration suppression.

Losses in the system include losses in energy conversion by transducer 12, losses due to voltage drops at diodes 36, 38 and MOSFETs 32, 34, switching losses, and losses due to parasitic resistances or capacitances through circuit 10.

The control methods or processes can vary dependent upon whether maximum power generation is desired or self-powering of a transducer acting as a vibration damping actuator is desired. When maximum power generation is desired a feedback control loop uses the signal from sensor 40 to direct MOSFETs 32, 34 to apply a voltage to transducer 12 which acts to increase the mechanical work on transducer 12 contracting and expanding transducer 12 in phase with disturbance 14 essentially softening transducer 12 to disturbance 14. More energy is extracted from disturbance 14, however vibration of the structure 50 (FIG. 6) creating disturbance 14 may be increased.

When transducer 20 is being used to dampen vibration of mechanical disturbance 14, a feedback control loop uses the signal from sensor 40 to adjust the duty cycle of MOSFETs 32, 34 to apply a voltage to transducer 12 which will act to damp the vibrations. The system provides self-powered vibration dampening in that power generated by transducer 12 is used to power transducer 12 for dampening.

Figure 6:
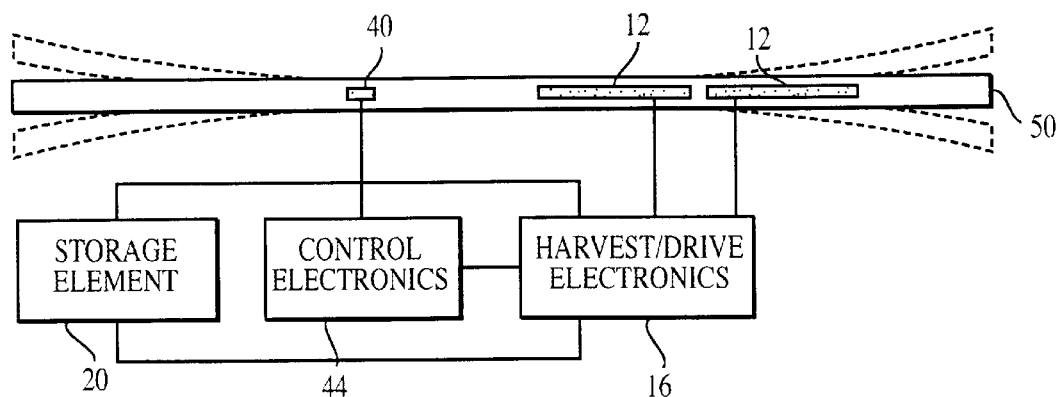
FIG. 6 shows an implementation of the power extraction system of FIG. 1B with a transducer of the system mounted to a structure.

Referring to FIG. 6, one or more transducers 20 can be attached, e.g., bonded, embedded, latched, riveted, etc., to one or more locations on a structure, e.g., aircraft fuselage 50, and connected to one rectifier circuit 16 (or more than one rectifier circuit). Any mechanical connection which can transmit loads and/or deflections of a mechanical disturbance to transducer 12 can be used. Movement of fuselage 50 creates mechanical disturbance 14 on transducer 12. Other mechanical interfaces for transferring a mechanical input to transducer 20 other than direct attachment to a structure include the use of a mechanical amplifier or hydraulic amplifier, where a mechanical disturbance external to the mechanical interface is coupled to transducer 12. An example is a Moonie configuration which transforms an external hydrostatic pressure to a disturbance which acts in a preferential fashion on transducer 12 to maximize the voltage or current response to the mechanical disturbance.

Transducer 20 is, for example, a piezoelectric transducer, an antiferroelectric transducer, an electrostrictive transducer, a piezomagnetic transducer, a magnetostrictive transducer, or a magnetic shape memory transducer. Examples of piezoelectric transducers include polycrystaline ceramics such as PZT 5H, PZT 4, PZT 8, PMN-PT, fine grain PZT, and PLZT; polymers such as electrostrictive and ferroelectric polymers, for example, PVDF and PVDF-TFE; single crystal ferroelectric materials such as PZN-PT, PMN-PT, NaBiTi-BaTi, and BaTi; and composites of these materials such as active fiber composites and particulate composites, generally with 1-3, 3-3, 0-3 or 2-2 connectivity patterns.

Possible mechanical configurations of transducer 12 include a disk or sheet in through thickness (33) mode, in transverse (31) or planar (p) mode, single or multilayer, bimorph, monomorph, stack configuration in through thickness (33) mode, rod or fiber poled transverse or along fiber, ring, cylinder or tube poled radially, circumferentially or axially, spheres poled radially, rolls, laminated for magnetic systems. Transducer 12 can be integrated into a mechanical device which transform forces/pressures and deformation external to the device into appropriate, advantageous forces/pressures and deformation on transducer 12.

Disturbance 14 can be an applied force, an applied displacement, or a combination thereof. For a disturbance applied to transducer 12 in the 33 direction, if the system is designed specifying the stress amplitude on transducer 12, the material from which transducer 12 is formed should be selected which maximizes $k_{gen}^2 s_{gen}^E$, for example, $k_{33}^2 s_{33}^E$. If the system is designed specifying the strain on transducer 12, a material should be selected which maximizes $k_{gen}^2/s_{gen}^D$, for example, $k_{33}^2/s_{33}^D$. Where $k_{gen}$ is the effective material coupling coefficient for the particular generalized disturbance on transducer 12, $s_{gen}^E$ is the effective compliance relating the generalized disturbance or displacement of the transducer in the short circuit condition, and $s_{gen}^D$ is the effective compliance relating the generalized disturbance or displacement of the transducer in an open circuit condition.

Figure 7:
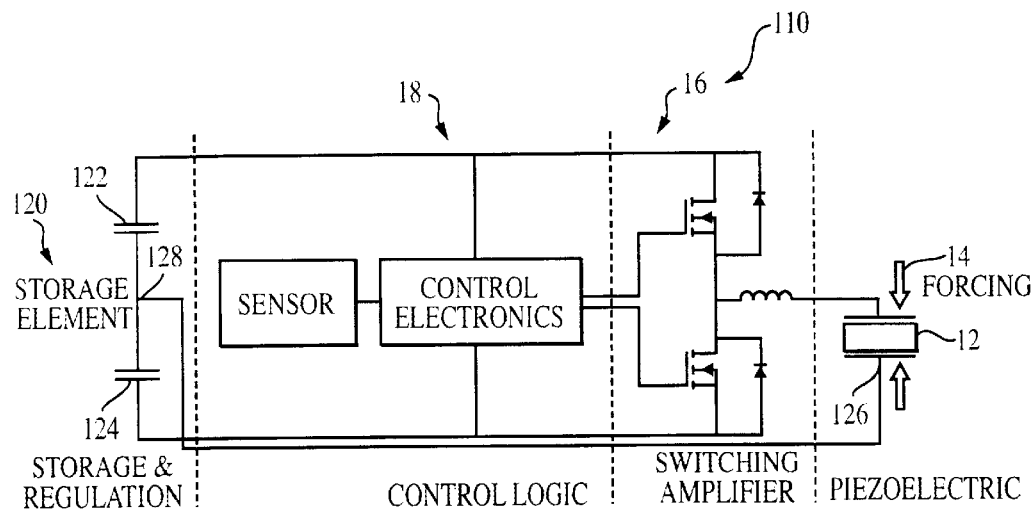
FIG. 7 is a circuit diagram of an alternative embodiment of a power extraction system.

Referring to FIG. 7, an alternative embodiment of a circuit 110 for extracting power from transducer 12 includes a storage element 120 which includes two storage components 122, 124 connected in series. One side 126 of transducer 12 is connected to a middle node 128 of components 122, 124. This connection biases transducer 12, permitting operation of circuit 110 when the voltage on transducer 12 is positive or negative.

Figure 8:
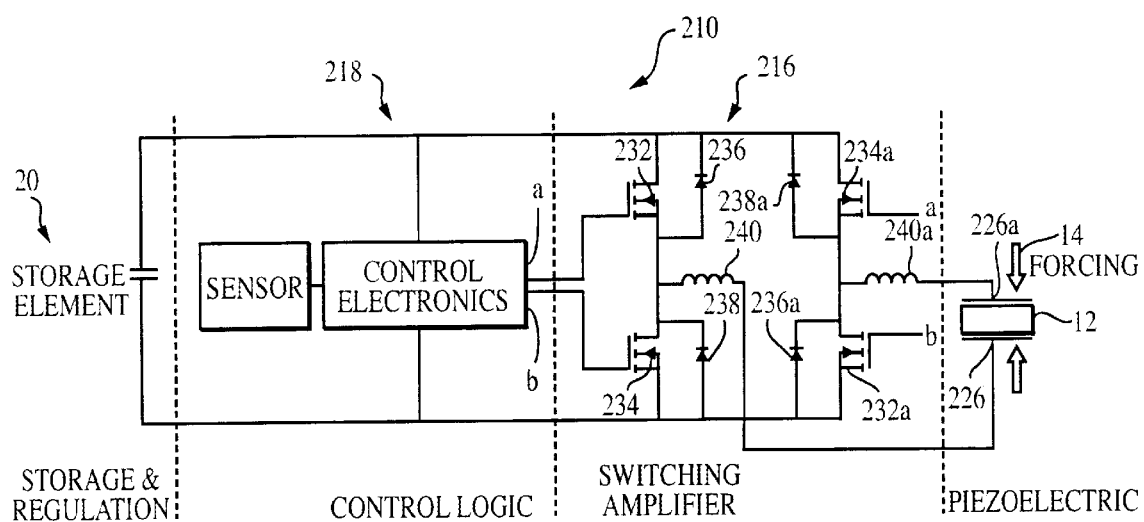
FIG. 8 is a circuit diagram of an additional alternative embodiment of a power extraction system.

Referring to FIG. 8, a circuit 210 includes an H-bridge switching amplifier 216. In a first approach, control logic 218 operates MOSFETs 232, 232a together, and MOSFETs 234, 234a together:

Phase I

MOSFETs 232, 232a are off, MOSFETs 234, 234a are turned on, current flows through MOSFETs 234, 234a, and energy from transducer 12 is stored in inductors 240, 240a.

Phase II

MOSFETs 234, 234a are turned off and MOSFETs 232, 232a are switched on, current flows through diodes 236, 236a, and the energy stored in inductors 240, 240a is transferred to storage element 20.

Phase III

As the current becomes negative, the current stops flowing through diodes 236, 236a and flows through MOSFETs 232, 232a, and energy from storage element 20 is transferred to inductors 240, 240a.

Phase IV

MOSFETs 232, 232a are turned off, current flowing through diodes 238, 238a increases, and the energy stored in inductors 240, 240a is transferred to transducer 12.

In a second operational approach, only half of the H-bridge is operated at any given time, depending upon the polarity of the voltage desired on transducer 12. When a positive voltage is desired, MOSFET 234a is turned off and MOSFET 232a is tuned on, grounding side 226a of transducer 12. MOSFETs 232 and 234 are then turned on and off as described above with reference to FIG. 2, to affect the voltage on side 226 of transducer 12. When a negative voltage on transducer 12 is desired, MOSFET 232 is turned off and MOSFET 234 is turned on, grounding side 226 of transducer 12. MOSFETs 232a and 234a are then turned on and off as described above with reference to FIG. 2, to affect the voltage on side 226a of transducer 12.

Figure 9:
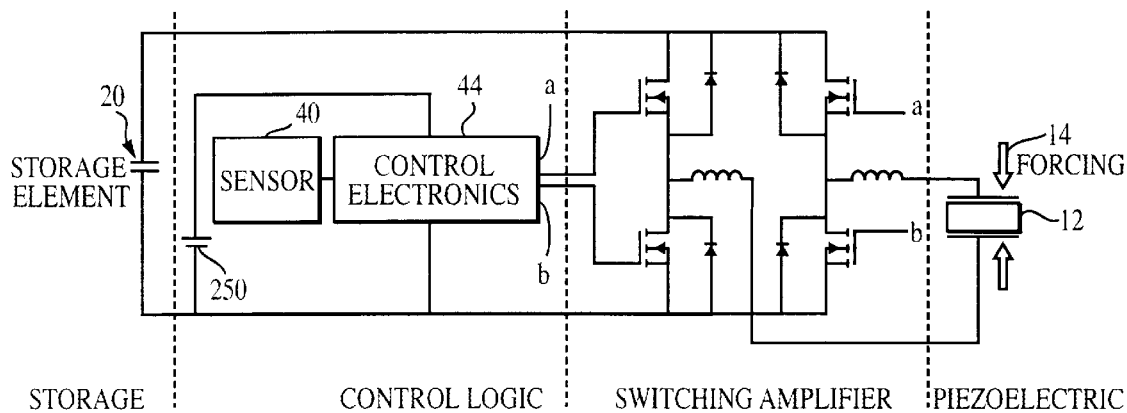
FIG. 9 is a circuit diagram of an additional alternative embodiment of a power extraction system.

Referring to FIG. 9, the circuit of FIG. 8 has been modified by including an independent power source, for example, a battery 250, which powers sensor 40 and control electronics 44. Storage element 20 still stores power to be transferred to and received from transducer 20.

Figure 10A:
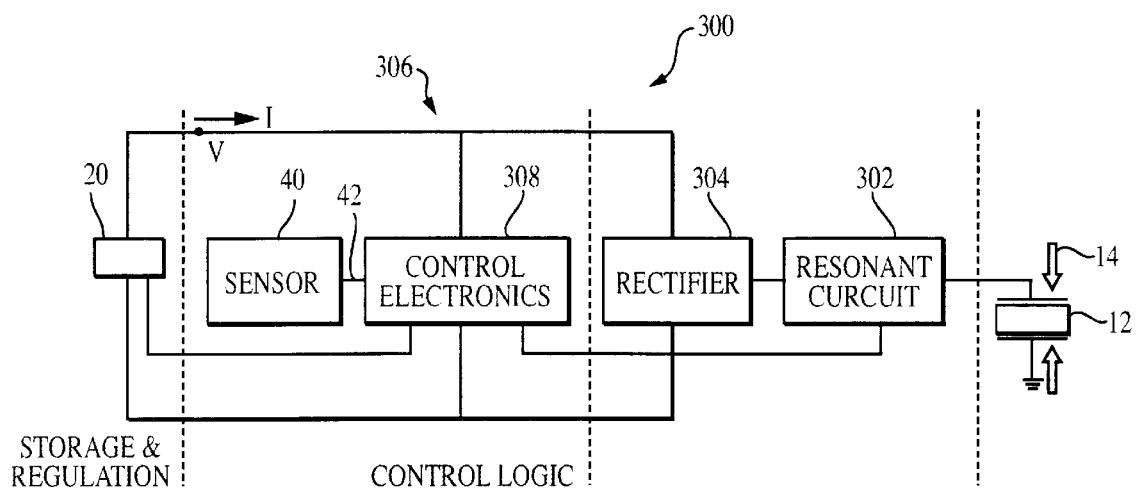
FIG. 10A is a block diagram of a power extraction system including a resonant circuit and a rectifier.

Referring to FIG. 10A, a simplified, resonant power extracting circuit 300 can be employed in place of amplifier electronics 15 for extracting power from transducer 12. Circuit 300 includes a resonant circuit 302, a rectifier 304, control logic 306, and a storage element 20, for example, a rechargeable battery or capacitor. Resonant circuit 302 includes elements such as capacitors and inductors which when coupled to the transducer produce electrical resonances in the system. Resonant circuit 302 provides for flow of electrical power from and to transducer 12. Sensor 40 and control electronics 308 can be used to adapt the voltage level of supply 20, adapt the inductance value or control switches which may be used in rectifier 304.

Figure 10B:
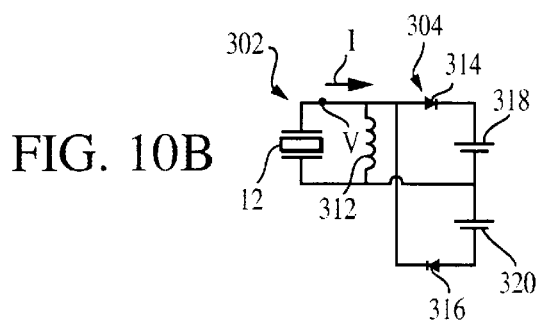
FIG. 10B is a circuit diagram of a particular embodiment of the power extraction system of FIG. 10A.

For example, referring to FIG. 10B, a piezoelectric transducer 12 is connected to a resonant circuit 302 formed by an inductor 312. Resonant circuit 302 is effective in a narrow frequency band dependent upon the value of inductor 312. The value of inductor 312 is selected such that the resonant frequency of the capacitance of transducer 12 and the inductance of inductor 312 is tuned to or near the dominant frequency, frequencies or range of frequencies of disturbance 14 or the resonance of the mechanical system. Rectifier 304 is a voltage doubling rectifier including diodes 314, 316. Power extracted from transducer 12 is stored in storage elements 318, 320.

For a magnetostrictive transducer 12, the resonant circuit 302 can include a capacitor connected in parallel with transducer 12.

The amplitude of the voltage across inductor 312 grows as a result of resonance until the voltage is large enough to forward bias one of diodes 314, 316. This occurs when the voltage across inductor 312 is greater than the voltage across one of storage elements 318, 320.

In the case of a sinusoidal disturbance, the current flow through circuit 310 can be described in four phases:

Phase I

As the transducer voltage increases from zero, no current flows through diodes 314, 316 while the transducer voltage is less than the voltage on storage elements 318, 320.

Phase II

When the transducer voltage grows larger than the voltage on storage element 318, diode 314 becomes forward biased, and current flows through diode 314 into storage element 318.

Phase III

As the transducer voltage drops, diodes 314, 316 are reverse-biased and again no current flows through the diodes.

Phase IV

When the transducer voltage goes negative and has a magnitude greater than the voltage on storage element 320, diode 316 becomes forward biased, and current flows through diode 316 into storage element 320. As the transducer voltage begins to increase, diodes 314, 316 are reverse-biased again and phase 1 repeats.

Referring to FIGS. 11A–11G, an example of the power extracted from transducer 12 in circuit 310 is graphically represented where the open circuit amplitude of the voltage across transducer 12 would have been 10 volts. The same transducer and disturbance described above with reference to FIGS. 3 are used in this example. A 168H inductor is used in this example such that the time constant of the inductor and transducer corresponds to 100 Hz.

Figure 11A:
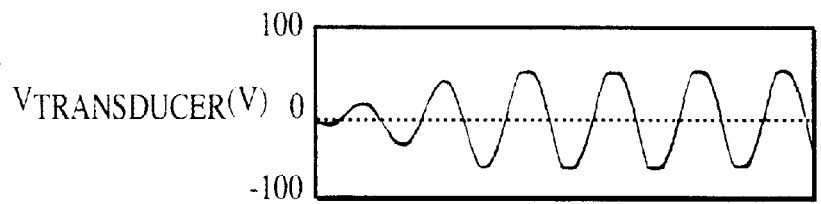
FIGS. 11A–11G are various voltage, current, power, and energy waveform diagrams of the circuit of FIG. 10B.
Figure 11B:
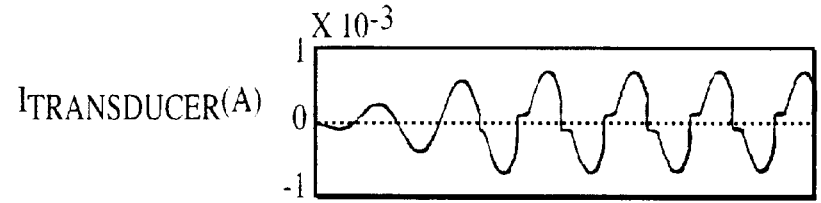
Figure 11C:
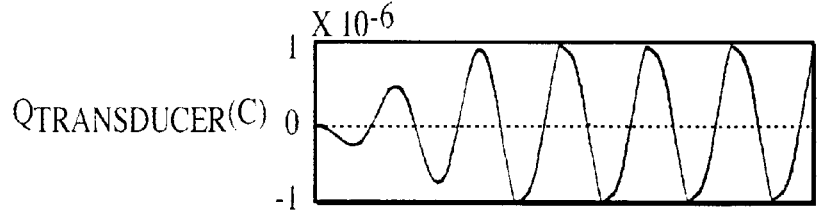

FIG. 11A shows the voltage across transducer 12 of FIG. 10 as a function of time. The peak amplitude of the voltage grows as a result of resonance until it is greater than the voltage on storage elements 318, 320. This voltage is greater than twice any peak voltage of the open circuit voltage of transducer 12 due to disturbance 14 alone (see FIG. 4A). Here, the peak amplitude of the voltage is about 60 volts. (The circuit can act in pure transient scenarios although transient to steady state is shown.) FIG. 11B shows the current waveform on transducer 12 and FIG. 11C the charge waveform on transducer 12. Due to the resonance of the circuit, the peak of the integral of the current onto and off transducer 12 is greater than two times higher than any peak of an integral of a current of a short circuit transducer due to the disturbance alone (see FIGS. 4B and 4C).

Figure 11D:
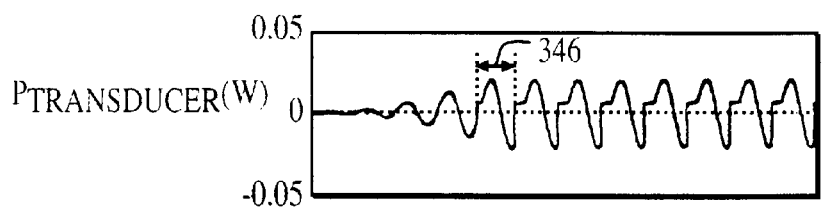

Due to the phasing of the voltage and current waveforms, the power flow to and from transducer 12, FIG. 11D, alternates between peaks of about 0.02 and −0.02 Watts. Thus, power flows to transducer 12 from resonator circuit 312 and from transducer 12 to resonator circuit 312 during the course of disturbance 14 on transducer 12, for example, during a single sinusoidal cycle 346, with the net power flowing from transducer 12 to storage element 318, 320. The cycle need not be sinusoidal, for example, where the disturbance has multiple frequency harmonics or broad frequency content such as in a square wave, a triangular wave, a saw tooth wave, and broadband noise.

Figure 11E:
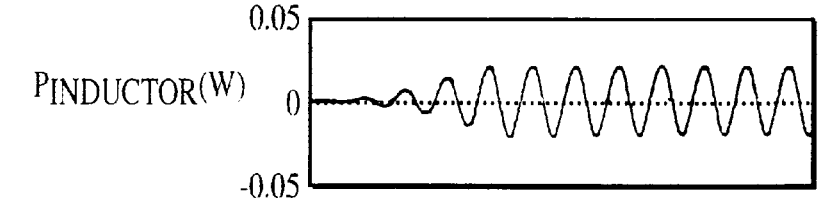

The power into inductor 312 is shown in FIG. 11E. Where the waveform is positive, power is being stored in inductor 312, and where the waveform is negative, power is being discharged from inductor 312.

Figure 11F:
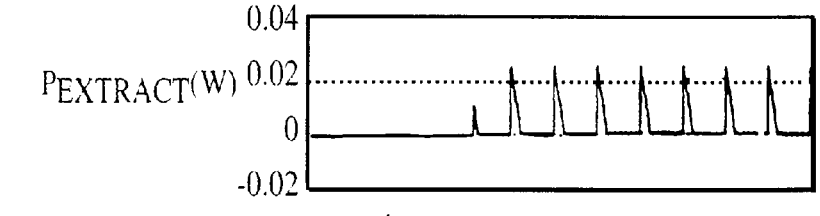
Figure 11G:
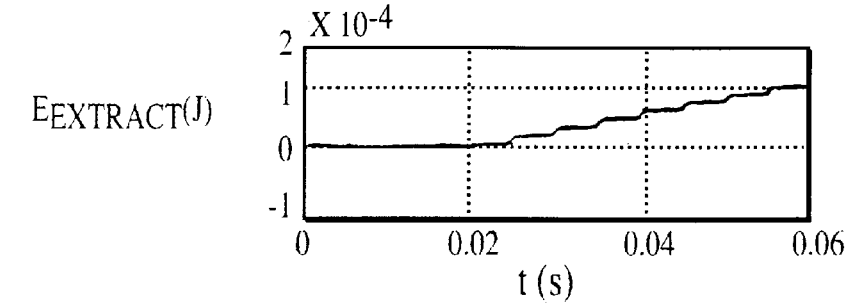

The extracted power and energy are shown in FIGS. 11F and 11G. Over a period of 0.06 seconds, approximately $1.0 \times 10^{-4}$ Joules of energy are extracted.

The voltage across storage elements 318, 320 is tuned to optimize the efficiency of the power extraction. For example, voltage across storage elements 318, 320 is optimally about half the peak steady state voltage across the transducer if no rectifier were coupled to the transducer and the transducer and inductor connected in parallel were resonating under the same disturbance. An adaptive system uses a sensor to adapt to changing system frequencies, damping, or behavior to adapt the resonator, supply voltage level, or possible rectifier switches.

Figure 12:
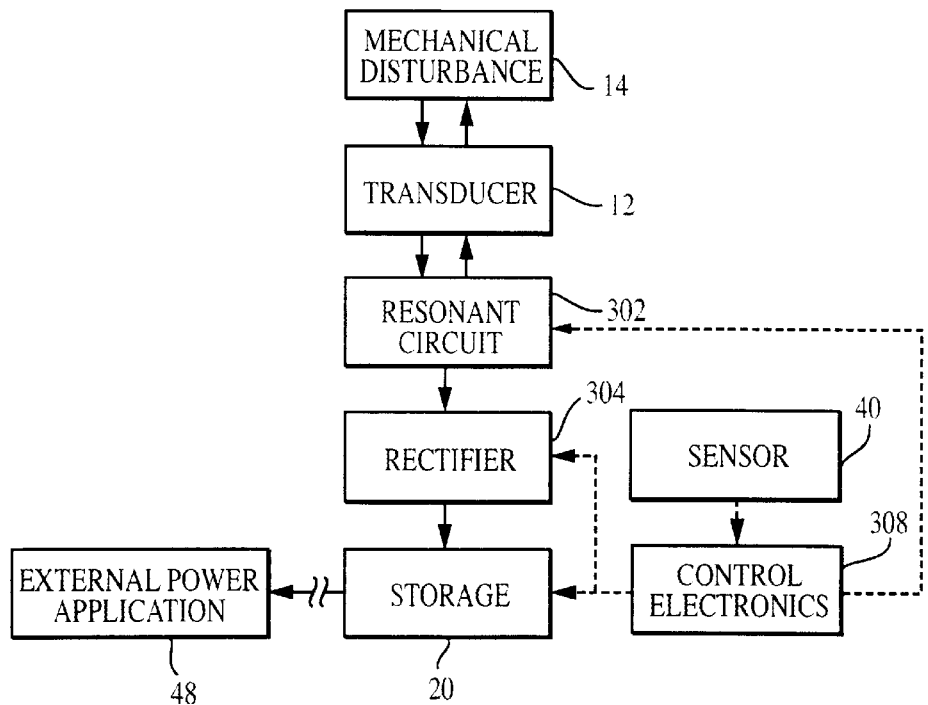
FIG. 12 is a block diagram of the power extraction system of FIG. 10B.

FIG. 12 shows the flow of power between disturbance 14 and storage element 20, and the flow of information (dashed lines). The power from mechanical disturbance 14 is transferred to transducer 12 which converts the mechanical power to electrical power. The power from transducer 12 is transferred to storage element 20 through resonant circuit 302 and rectifier 304. Power can also flow from resonant circuit 302 to transducer 12. Transducer 12 can then convert any received electrical power to mechanical power which in turn acts upon mechanical disturbance 14.

The power for sensor 40 and control electronics 308 is supplied by the energy accumulated in storage element 20, which has been extracted from disturbance 14. The cyclic peak power needed by transducer 12 is supplied by resonant circuit 302. Energy accumulated in storage element 20 can also or alternatively be used to power an external application 48 or the power extraction circuitry itself for vibration suppression.

Rather than employ a storage element, extracted power can be used directly to power external application 48.

Figure 13:
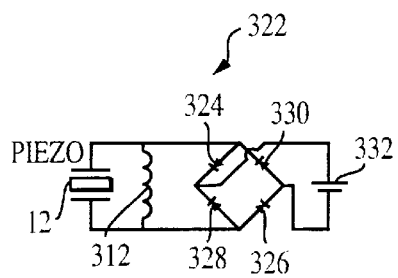
FIG. 13 is a circuit diagram of an alternative embodiment of a resonant rectifier power extraction system.

An alternative resonant circuit 322 is shown in FIG. 13. Circuit 322 includes an inductor 312 and four diodes 324, 326, 328 and 330 connected as a full wave bridge. Power extracted from transducer 12 is stored in storage element 332.

The current flow through circuit 322 can be described in four phases:
Phase I
As the transducer voltage increases from zero, no current flows through diodes 324, 326, 328 and 330 while the transducer voltage is less than the voltage on storage element 332.
Phase II
When the transducer voltage grows larger than the voltage on storage element 332, diodes 324, 326 become forward biased, and current flows through diodes 324, 326 and into storage element 332.
Phase III
As the transducer voltage drops, all diodes are reverse-biased and the system operates as an open circuit.
Phase IV
When the transducer voltage goes negative and has a magnitude greater than the voltage on storage element 332, diodes 328 and 330 become forward biased, and current flows through diodes 328 and 330 into storage element 332. As the transducer voltage begins to increase, all diodes again become reverse biased and phase 1 repeats.

Figure 14:
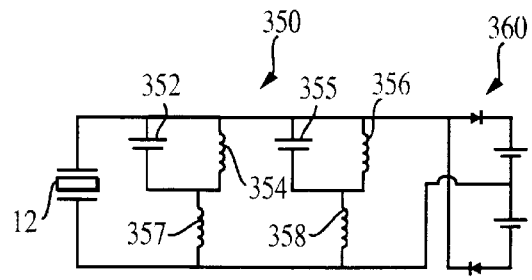
FIG. 14 is a circuit diagram of an additional alternative embodiment of a resonant rectifier power extraction system.

Referring to FIG. 14, a more sophisticated resonant circuit 350 includes two capacitor and inductor pairs 352, 354 and 355, 356, respectively, and two resonance inductors 357, 358. Each capacitor, inductor pair is tuned to a different frequency of interest. Thus, circuit 350 has multiple resonances which can be tuned to or near multiple disturbance frequencies or multiple resonances of the mechanical system. Additional capacitors and inductors may be incorporated to increase the number of resonances in circuit 350. Broadband behavior can be attained by placing a resistance in series or parallel with the inductors. FIG. 14 shows resonant circuit 350 connected to a voltage doubling rectifier 360, which operates as in FIG. 10B.

The different resonant circuits of FIGS. 10B nd 14, can be attached to different rectifier circuits, such as a full bridge rectifier or an N-stage parallel-fed rectifier.

A passive voltage doubling rectifier circuit 410 for extracting energy from transducer 12 is shown in FIG. 15. Circuit 410 includes diodes 414, 416. Power extracted from transducer 12 is stored in storage elements 418, 420.

The current flow through circuit 410 can be described in four phases:
Phase I
As the transducer voltage increases from zero, no current flows through diodes 414, 416 while the transducer voltage is less than the voltage on storage element 418.
Phase II
When the transducer voltage grows larger than the voltage on storage element 418, diode 414 becomes forward biased, and current flows through diode 414 into storage element 418.
Phase III
As the transducer voltage drops, diodes 414, 416 are reverse-biased and the circuit operates as an open circuit.
Phase IV
When the transducer voltage 4 goes negative and has a magnitude greater than the voltage on storage element 420, diode 416 becomes forward biased, and current flows through diode 416 into storage element 420. As the transducer voltage begins to increase, diodes 414, 416 are reverse-biased and phase 1 repeats.

Referring to FIGS. 16A–16F, an example of the power extracted from transducer 12 in circuit 410 is graphically represented where the open circuit amplitude of the voltage across transducer 12 would have been 10 volts. FIG. 16A shows the voltage across transducer 12 as a function of time. The peak amplitude of the voltage is about 5 volts. FIG. 16B shows the current waveform on transducer 12, and FIG. 16C the charge waveform.

The power to and from transducer 12, FIG. 16D, has a peak value of about $5 \times 10^{-4}$ Watts. The extracted power and energy are shown in FIGS. 16E and 16F. Over a period of 0.06 seconds, approximately $0.75 \times 10^{-5}$ Joules of energy are extracted.

The voltage across storage elements 418, 420 is tuned to optimize power extraction. The voltage across storage elements 418, 420 is optimally about half the voltage which would appear across an open circuit transducer undergoing the same mechanical disturbance.

Figure 17:
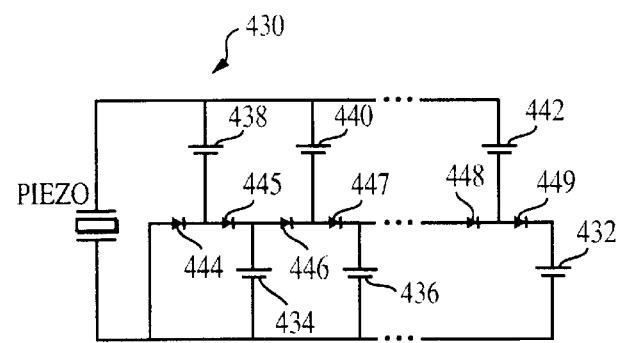
FIG. 17 is a circuit diagram of an alternative embodiment of a passive rectifier power extraction system.

Referring to FIG. 17, in a passive, N-stage parallel fed voltage rectifier 430 the voltage of storage element 432 is N times the amplitude of the voltage of disturbance 14. Capacitors 434, 436 act as energy storage elements with the voltage in each stage being higher than the voltage in the previous stage. Capacitors 438, 440 and 442 act as pumps transferring charge from each stage to the next, through diodes 444–449. A resonant circuit as described above can be incorporated into rectifier 430.

Figure 18A:
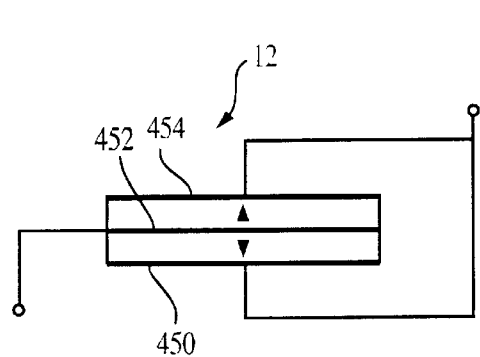
FIGS. 18A–18B illustrate partitioning of a transducer.
Figure 18B:
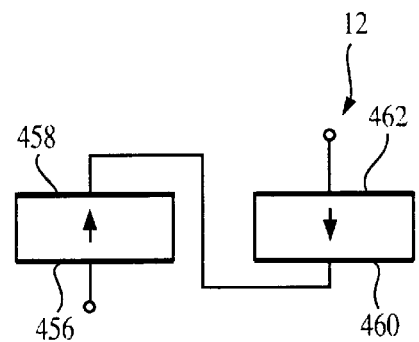

A transducer may be partitioned, and different electrode or coil configurations, that is, the electrical connections to transducer 12, may be used to optimize electric characteristics. Such configurations are shown for piezoelectric transducers in FIGS. 18A and 18B where for the same volume of material and the same external disturbance, different electrode configurations provide tradeoffs between the voltage and current output of transducer 12. For example, in FIG. 18A transducer 12 is segmented longitudinally and connected electrically in parallel with electrodes 450, 452, and 454, providing for higher current and lower voltage. In FIG. 18B, the transducer area is segmented and connected electrically in series with electrodes 456, 458, 460, and 462, providing for higher voltage and lower current.

Other embodiments are within the scope of the following claims.

What is claimed is:

1. A method of extracting power, comprising the steps of:
coupling a transducer that converts mechanical power to electrical power to a disturbance,
coupling an electrical circuit to the transducer such that a peak voltage experienced by the transducer is greater than two times higher than any peak voltage of an open circuit transducer due to the disturbance alone, wherein coupling the electrical circuit includes controlling switches electrically connected to the transducer,
extracting power from the transducer using the electrical circuit, and
storing extracted power.

2. The method of claim 1 further comprising applying stored extracted power to an external load.

3. The method of claim 1 wherein the step of coupling the electrical circuit includes applying stored extracted power to the transducer.

4. The method of claim 1 wherein the step of coupling the electrical circuit includes coupling a resonant circuit to the transducer.

5. The method of claim 1 wherein controlling switches includes controlling a duty cycle of the switches.

6. The method of claim 1 wherein the step of controlling includes monitoring a system state.

7. The method of claim 6 wherein controlling switches includes controlling a duty cycle of the switches based on the system state.

8. The method of claim 1 wherein the step of coupling the electrical circuit acts to increase oscillations of the disturbance.

9. The method of claim 1 wherein the step of coupling the electrical circuit acts to dampen oscillations of the disturbance.

10. The method of claim 1 wherein the step of coupling the transducer includes coupling a plurality of transducers to the disturbance.

11. The method of claim 1 wherein the step of coupling the transducer includes attaching the transducer to a structure.

12. A method of extracting power, comprising the steps of:
coupling a transducer that converts mechanical power to electrical power to a disturbance,
coupling an electrical circuit to the transducer such that a peak of the integral of the current onto and off the transducer is greater than two times higher than any peak of an integral of a current of a short circuit transducer due to the disturbance alone, wherein coupling the electrical circuit includes controlling switches electrically connected to the transducer,
extracting power from the transducer using the electrical circuit, and
storing extracted power.

13. The method of claim 12 further comprising applying extracted power to an external load.

14. The method of claim 12 wherein the step of coupling the electrical circuit includes applying extracted power to the transducer.

15. The method of claim 12 wherein the step of coupling the electrical circuit includes coupling a resonant circuit to the transducer.

16. The method of claim 14 wherein controlling switches includes controlling a duty cycle of the switches.

17. The method of claim 14 wherein the step of controlling includes monitoring a system state.

18. The method of claim 17 wherein controlling switches includes controlling a duty cycle of the switches based on the system state.

19. The method of claim 12 wherein the step of coupling the electrical circuit acts to increase oscillations of the disturbance.

20. The method of claim 12 wherein the step of coupling the electrical circuit acts to dampen oscillations of the disturbance.

21. The method of claim 12 wherein the step of coupling the transducer includes coupling a plurality of transducers to the disturbance.

22. The method of claim 12 wherein the step of coupling the transducer includes attaching the transducer to a structure.

23. A method of extracting power, comprising the steps of:
coupling a transducer that converts mechanical power to electrical power to a disturbance,
measuring a mechanical state with a sensor,
controlling an electrical circuit coupled to the transducer based on the measured mechanical state,
extracting power from the transducer using the electrical circuit, and
storing extracted power.

24. The method of claim 23 further comprising applying extracted power to an external load.

25. The method of claim 23 wherein the step of coupling the electrical circuit includes applying extracted power to the transducer.

26. The method of claim 23 wherein the step of coupling the electrical circuit includes coupling a resonant circuit to the transducer.

27. The method of claim 23 wherein the step of coupling the electrical circuit includes controlling switches electrically connected to the transducer.

28. The method of claim 27 wherein controlling switches includes controlling a duty cycle of the switches.

29. The method of claim 23 wherein the step of coupling the electrical circuit acts to increase oscillations of the disturbance.

30. The method of claim 23 wherein the step of coupling the electrical circuit acts to dampen oscillations of the disturbance.

31. The method of claim 23 wherein the step of coupling the transducer includes coupling a plurality of transducers to the disturbance.

32. The method of claim 23 wherein the step of coupling the transducer includes attaching the transducer to a structure.

33. A method of extracting power, comprising the steps of:
coupling a transducer that converts mechanical power to electrical power to a disturbance,
coupling an electrical circuit to the transducer,
controlling switches of the electrical circuit such that the switches switch at a frequency greater than two times an excitation frequency of the disturbance,
extracting power from the transducer using the electrical circuit, and
storing extracted power,
wherein coupling the electrical circuit includes applying extracted power to the transducer.

34. The method of claim 33 further comprising applying extracted power to an external load.

35. The method of claim 33 wherein the step of controlling switches includes controlling a duty cycle of the switches.

36. The method of claim 33 wherein the step of controlling switches includes monitoring a system state.

37. The method of claim 36 wherein controlling switches includes controlling a duty cycle of the switches based on the system state.

38. The method of claim 33 wherein the step of coupling the electrical circuit acts to increase oscillations of the disturbance.

39. The method of claim 33 wherein the step of coupling the electrical circuit acts to dampen oscillations of the disturbance.

40. The method of claim 33 wherein the step of coupling the transducer includes coupling a plurality of transducers to the disturbance.

41. The method of claim 33 wherein the step of coupling the transducer includes attaching the transducer to a structure.

42. A method of extracting power, comprising the steps of:
coupling a transducer that converts mechanical power to electrical power to a mechanical disturbance,
extracting power from the transducer and applying power to the transducer during different intervals in the course of the disturbance, wherein extracting power from the transducer and applying power to the transducer includes the use of amplifier electronics, and
storing extracted power.

43. The method of claim 42 wherein the step of extracting power from the transducer and applying power to the transducer occurs in a single cycle.

44. The method of claim 42 further comprising applying extracted power to an external load.

45. The method of claim 42 wherein the step of applying power includes applying extracted power to the transducer.

46. The method of claim 42 wherein the step of extracting power from the transducer and applying power to the transducer includes the use of a resonant circuit.

47. The method of claim 42 wherein the step of coupling the transducer includes coupling a plurality of transducers to the disturbance.

48. The method of claim 42 wherein the step of coupling the transducer includes attaching the transducer to a structure.

49. The system for extracting power, comprising:
a transducer that converts mechanical power to electrical power, the transducer configured for coupling to a disturbance,
an electrical circuit connected across the transducer such that a peak voltage experienced by the transducer is greater than two times higher than any peak voltage of an open circuit transducer due to the disturbance alone, the electrical circuit including amplifier electronics, and
a storage element for storing extracted power.

50. The system of claim 49 wherein the circuit includes a resonant electrical circuit and a rectification circuit.

51. The system of claim 46 wherein the amplifier electronics comprise an H-bridge.

52. The system of claim 46 wherein the amplifier electronics comprise a half bridge.

53. The system of claim 46 wherein the electrical circuit further includes control electronics for controlling the amplifier electronics.

54. The system of claim 53 wherein the control electronics control a duty cycle of the amplifier electronics.

55. The system of claim 49 wherein the electrical circuit further includes a sensor for monitoring a system state used to control the electrical circuit.

56. The system of claim 49 wherein the storage element comprises a capacitor.

57. The system of claim 49 wherein the storage element comprises a rechargeable battery.

58. The system of claim 49 wherein the storage element comprises two components connected in series, a side of the transducer being connected to a node between the two components.

59. A system for extracting power, comprising:
a transducer that converts mechanical power to electrical power, the transducer configured for coupling to a disturbance, and
an electrical circuit connected across the transducer such that a peak of the integral of the current onto and off the transducer is greater than two times higher than any peak of an integral of a current of a short circuit transducer due to the disturbance alone, the electrical circuit including amplifier electronics, and
a storage element for storing extracted power.

60. The system of claim 59 wherein the circuit includes a resonant circuit and a rectification circuit.

61. The system of claim 54 wherein the amplifier electronics comprise an H-bridge.

62. The system of claim 54 wherein the amplifier electronics comprise a half bridge.

63. The system of claim 54 wherein the electrical circuit further includes control electronics for controlling the amplifier electronics.

64. The system of claim 63 wherein the control electronics control a duty cycle of the amplifier electronics.

65. The system of claim 59 wherein the electrical circuit further includes a sensor for monitoring a system state used to control the electrical circuit.

66. The system of claim 59 wherein the storage element comprises a capacitor.

67. The system of claim 59 wherein the storage element comprises a rechargeable battery.

68. The system of claim 59 wherein the storage element comprises two storage components connected in series, a side of the transducer being connected to a node between the two components.

69. A system for extracting power, comprising:
a transducer that converts mechanical power to electrical power, the transducer configured for coupling to a mechanical disturbance,
an electrical circuit including switching electronics connected across the transducer control logic which switch the switching electronics at a frequency greater than two times an excitation frequency of the disturbance, and
a storage element for storing extracted power, and
a sensor for measuring a system state, the operation of the controlled switching being based on the measured system rate.

70. The system of claim 69 wherein the control logic controls the duty cycle of the switching electronics.

71. The system of claim 69 wherein the switching electronics comprise an H-bridge.

72. The system of claim 69 wherein the switching electronics comprise a half bridge.

73. The system of claim 69 wherein the storage element comprises a capacitor.

74. The system of claim 69 wherein the storage element comprises a rechargeable battery.

75. The system of claim 69 wherein the storage element comprises two storage components connected in series, a side of the transducer being connected to a node between the two components.

76. A system for extracting power, comprising:
- a transducer that converts mechanical power to electrical power, the transducer configured for coupling to a disturbance,
- an electrical circuit connected across the transducer and capable of extracting power from the transducer and applying power to the transducer during different intervals in the course of the disturbance, the electrical circuit including amplifier electronics, and
- a storage element for storing extracted power.

77. The system of claim 76 wherein the electrical circuit is capable of extracting power from the transducer and applying power to the transducer in a single cycle.

78. The system of claim 76 wherein the circuit includes a resonant circuit and a rectification circuit.

79. The system of claim 76 wherein the amplifier electronics comprise an H-bridge.

80. The system of claim 76 wherein the amplifier electronics comprise a half bridge.

81. The system of claim 76 wherein the electrical circuit further includes control electronics for controlling the amplifier electronics.

82. The system of claim 81 wherein the control electronics control a duty cycle of the amplifier electronics.

83. The system of claim 76 wherein the electrical circuit further includes a sensor for monitoring a system state used to control the electrical circuit.

84. The system of claim 76 wherein the storage element comprises a capacitor.

85. The system of claim 76 wherein the storage element comprises a rechargeable battery.

86. The system of claim 76 wherein the storage element comprises two storage components connected in series, a side of the transducer being connected to a node between the two components.

87. The system of claim 69 wherein the switching electronics are connected across the transducer such that a peak voltage experienced by the transducer is higher than any peak voltage of an open circuit transducer due to the mechanical disturbance alone.

* * * * *